United States Patent [19]

Plichta

[11] Patent Number: 5,224,575
[45] Date of Patent: Jul. 6, 1993

[54] POWER CONDUCTOR RAIL EXPANSION JOINT

[75] Inventor: Dietmar G. Plichta, Clyde, Calif.

[73] Assignee: Inesscon Inc., Concord, Calif.

[21] Appl. No.: 808,489

[22] Filed: Dec. 17, 1991

[51] Int. Cl.⁵ .............................................. B60M 1/30
[52] U.S. Cl. ................... 191/22 R; 191/29 R; 238/14.6; 238/232; 238/236
[58] Field of Search ............... 191/22 R, 29 R, 44.1; 238/14.05, 14.2, 14.4, 14.5, 14.6, 230, 231, 232, 234, 236, 237, 238, 239

[56] References Cited

U.S. PATENT DOCUMENTS

| | | | |
|---|---|---|---|
| 968,408 | 8/1910 | Poirier | 238/236 |
| 987,072 | 3/1911 | Humason et al. | 238/14.6 X |
| 1,132,461 | 3/1915 | Dimm | 238/236 |
| 1,365,941 | 1/1921 | Murphy | 238/236 |
| 1,896,964 | 2/1933 | Lind | 238/14.6 X |
| 2,093,816 | 9/1937 | Moak et al. | 238/14.6 |
| 2,598,101 | 5/1952 | Baumann | 238/232 |
| 2,710,147 | 6/1955 | Baumann | 238/232 |
| 3,689,713 | 9/1972 | Shkredka | 191/29 R |
| 3,790,725 | 2/1974 | Charamel et al. | 191/29 R |

FOREIGN PATENT DOCUMENTS

| | | | |
|---|---|---|---|
| 452800 | 5/1913 | France | 238/237 |
| 1156982 | 5/1958 | France | 238/232 |
| 509574 | 10/1955 | Italy | 238/232 |
| 1263845 | 11/1986 | Japan | 191/44.1 |

Primary Examiner—Frank E. Werner
Assistant Examiner—Scott L. Lowe
Attorney, Agent, or Firm—Townsend and Townsend Khourie and Crew

[57] ABSTRACT

A linear thermal expansion joint between two sections of power conductor rail formed of steel web and aluminum cladding about the web, each rail section longitudinally and vertically halved at the rail end through the center of the steel web creating a mating surface of selected expansion length. Each rail end includes an elongated slot and a guide block secured to the aluminum cladding and extending through the slot. The rail ends are slidingly secured together with bolts and spring washers on the guide blocks so that the rail ends overlap side by side with the mating surfaces facing each other sandwiching a brass slide plate which facilities longitudinal movement between the rail sections. Exposed ends of the rail contact surfaces are chamfered to eliminate snags or sharp surfaces and to compensate for small dimensional differences between rail sections during alignment and assembly of the expansion joint. The expansion joint provides superior conductivity and continuity of electrical resistance across a rail length using a simple, low maintenance and cost effective construction.

22 Claims, 3 Drawing Sheets

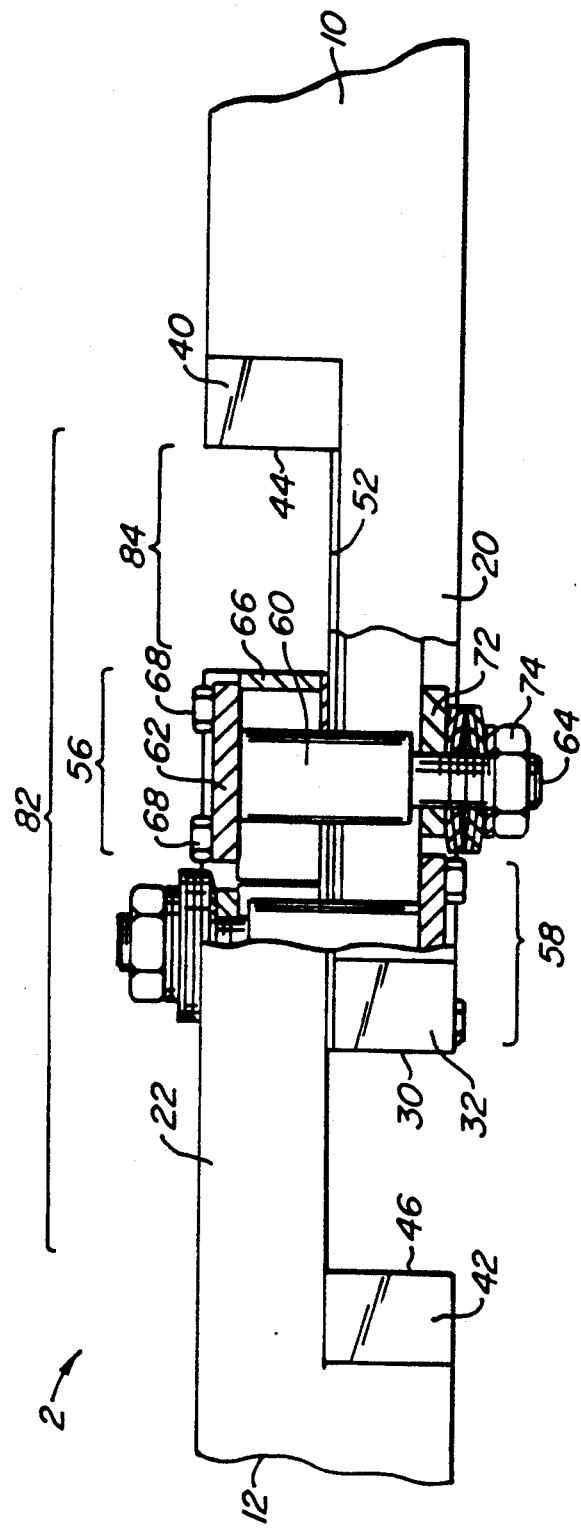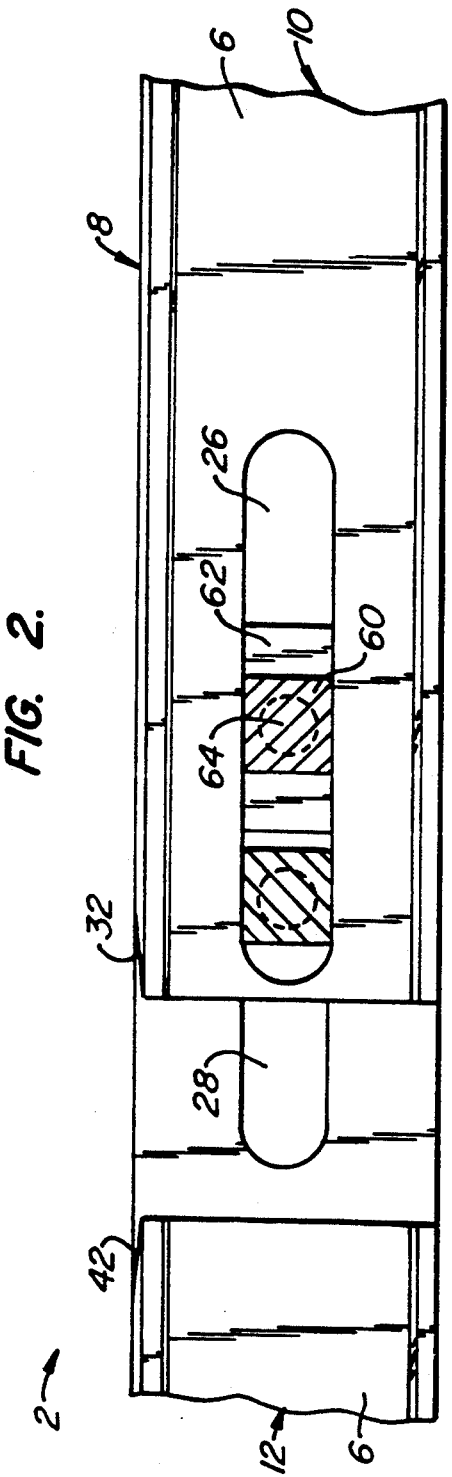

POWER CONDUCTOR RAIL EXPANSION JOINT

BACKGROUND OF THE INVENTION

The invention generally relates to power conductor rails used for electrically powered rail vehicles and more specifically to power conductor rail expansion joints.

Electrically powered rail vehicles have long been used for mass transit systems. Electric rail systems typically employ a three rail configuration, the rail system having two running rails to support the vehicle and a third rail to conduct the necessary electrical power. The vehicle has a contact shoe which extends out from the vehicle and makes electrical contact with the third rail.

In the late 1960s, Metro Transit Authorities and supporting manufacturing companies began experimenting with different rail structures for third rails in an effort to reduce electrical resistance. Various conductor rail constructions evolved from these experimental efforts. As rail structures began to take new shapes, research regarding the methods of connecting rails sections quickly followed.

A particular problem associated with power conductor rail systems is the need for power continuity along the rail length. Conductor rails are typically comprised of a series of linked rail sections which are connected linearly in the field during installation by mechanical splice joints or welded joints to establish a long continuous rail assembly. Thermal expansion elongation of the rail must be absorbed by the length of the rail system loop. Conventionally, mechanical expansion joints made of steel are incorporated into the rail length at joining rail sections. The adjoining rail sections would have to be connected by a series of power cables in an attempt to keep power transfer continuous. Even with this type of construction, power continuity can never realistically be achieved because the power transfer cables are of a different resistance than that of the rail. Additionally, power transfer cables tend to establish electrical "hot spots" under power flow. Consistent electrical resistance throughout the full length of the power rail is necessary for an efficient power rail system but impossible to obtain using conventional constructions.

In an effort to improve power transfer, various expansion joint structures for conductor rails have been designed. An example is that taught by U.S. Pat. No. 3,790,725 to Charamel et al. issued Feb. 5, 1974. Another example in U.S. Pat. No. 3,689,713 to Shkredka issued Sep. 5, 1972. These expansion joint constructions, however, are complex and extremely expensive to fabricate and install making such structures nearly cost prohibitive under most circumstances.

SUMMARY OF THE INVENTION

In accordance with the invention, a high conductivity thermal expansion joint structure for power conductor rails is provided offering superior conductivity, simplicity and construction. The invention also provides significantly lower fabrication and installation costs relative to the prior art. The expansion joint is intended to be positioned in the conductor rail length at certain intervals to allow thermal expansion and contraction of the rail. The expansion joint is formed at the connection between two rail sections of aluminum clad conductive rail such as that disclosed in pending patent application Ser. No. 07/791,809, filed Nov. 13, 1991 for a power conductor rail the disclosure herein incorporated by reference.

The expansion joint uses high conductivity aluminum clad rail sections which are longitudinally halved vertically through the center of the rail steel web to create lengths of half rail. The half rail portions are complementary, that is, they are placed side-by-side to form an overlap equal in dimension to the cross section of the whole rail. Each rail end includes a slot milled in the cut half rail equal in length to the desired Expansion Distance ($E_r$). The slot receives a guide block which extends through the slot and has a fixed end and a sliding end. The fixed end is secured to the outside surface of the aluminum cladding of the half rail and the sliding end extends through the slot to the cut away side. The corresponding half rail portions are placed together cut away side to cut away side and each half rail slot receives the sliding end of the opposite guide block as the half rails overlap. A brass slide plate is inserted between the mating cut away sides and is sandwiched between the steel faces of the rail webs to provide increased conductivity and provide an enhanced slide surface between the half rail portions. The half rails are held together tightly by bolt and spring washer fasteners mounted on the sliding ends of the guide blocks.

The resultant structure allows the rail ends to slide longitudinally against each other as the rail expands and contracts due to thermal fluctuations. The mating steel webs sandwich the brass plate and form a solid connection the two rail ends for full electrical power transfer across the expansion joint. The mating and sliding surfaces are lubricated with corrosion protective and conductivity enhancing no-oxide lubricant to maintain low resistance across the joint and facilitate expansion and contraction.

The invention provides a cost effective expansion joint for power rails which simplifies construction, installation and is significantly less expensive than conventional structures. The invention provides high conductivity, low maintenance and rail electrical resistance continuity. These and other features and advantages of the invention will become apparent from the following description and drawings.

BRIEF DESCRIPTION OF THE DRAWINGS

FIG. 2 is a top plan view, partially in section, of the invention illustrated in FIG. 1 showing adjoining half rails and guide blocks;

FIG. 3 is a side view of the device of FIG. 2 but with the fasteners cut away to show cross sectional views of the guide blocks;

DESCRIPTION OF THE PREFERRED EMBODIMENT

Figure 1:
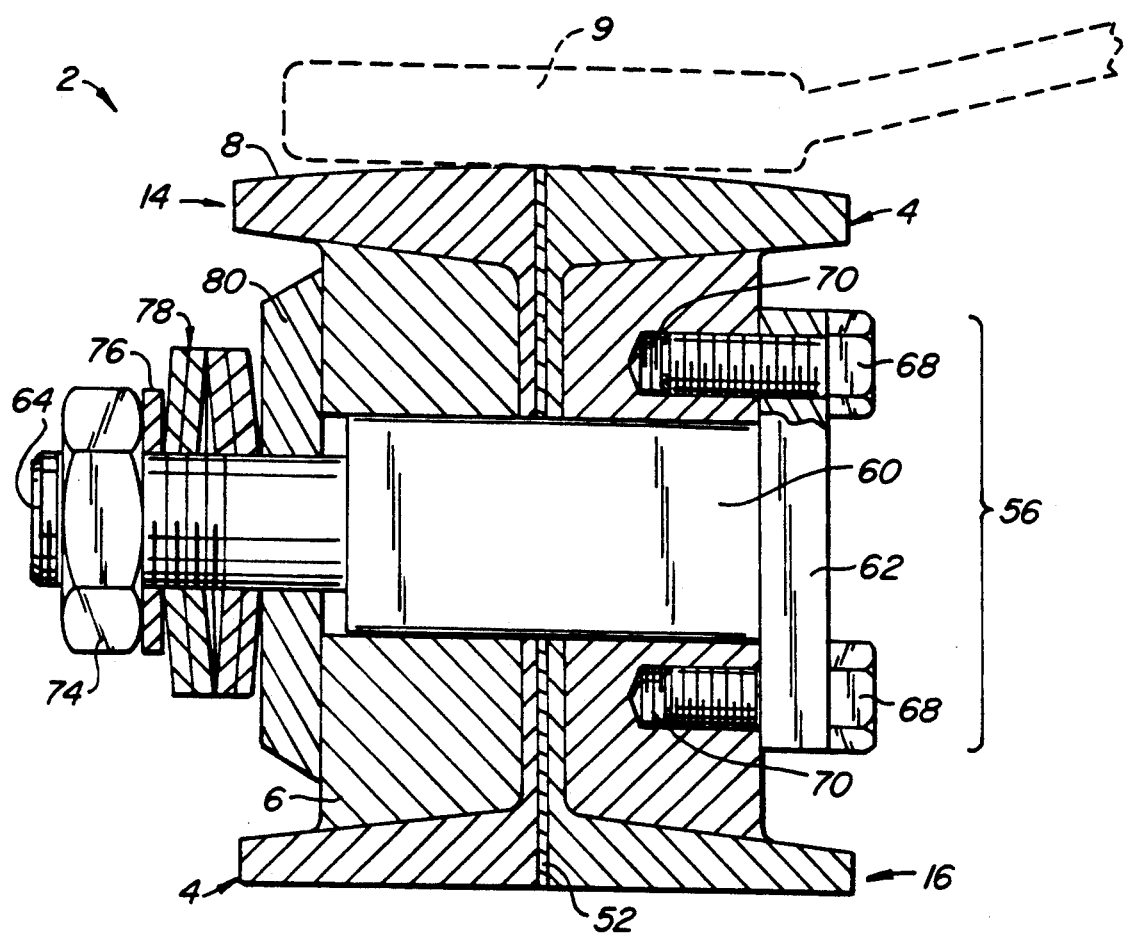
FIG. 1 is a front plan view in cross section of the invention illustrating adjoining half rails connected and secured into position with a guide block fastener.

FIG. 1 illustrates in cross section the invention employed in a power conductor rail. Generally, expansion joint 2 is provided in power conductor rail paths and is formed at the mating joint between rail sections. The expansion joint 2 allows expansion and contraction of the adjoining rail sections without loss of power conductivity through the rail. Generally speaking, the invention is intended to be used with a multimetallic power conductor rail such as that disclosed in pending U.S. patent application Ser. No. 07/791,809, filed Nov. 13, 1991, herein incorporated by reference. The invention, however, can be employed in conventional bimetallic conductor rail systems having a generally I-beam shaped steel rail web 4 and aluminum cladding 6 extruded about the rail web 4. Steel rail web 4 includes a contact surface 8 for electrical contact with contact shoe 9 extending from an electric rail vehicle (not shown).

Figure 4:
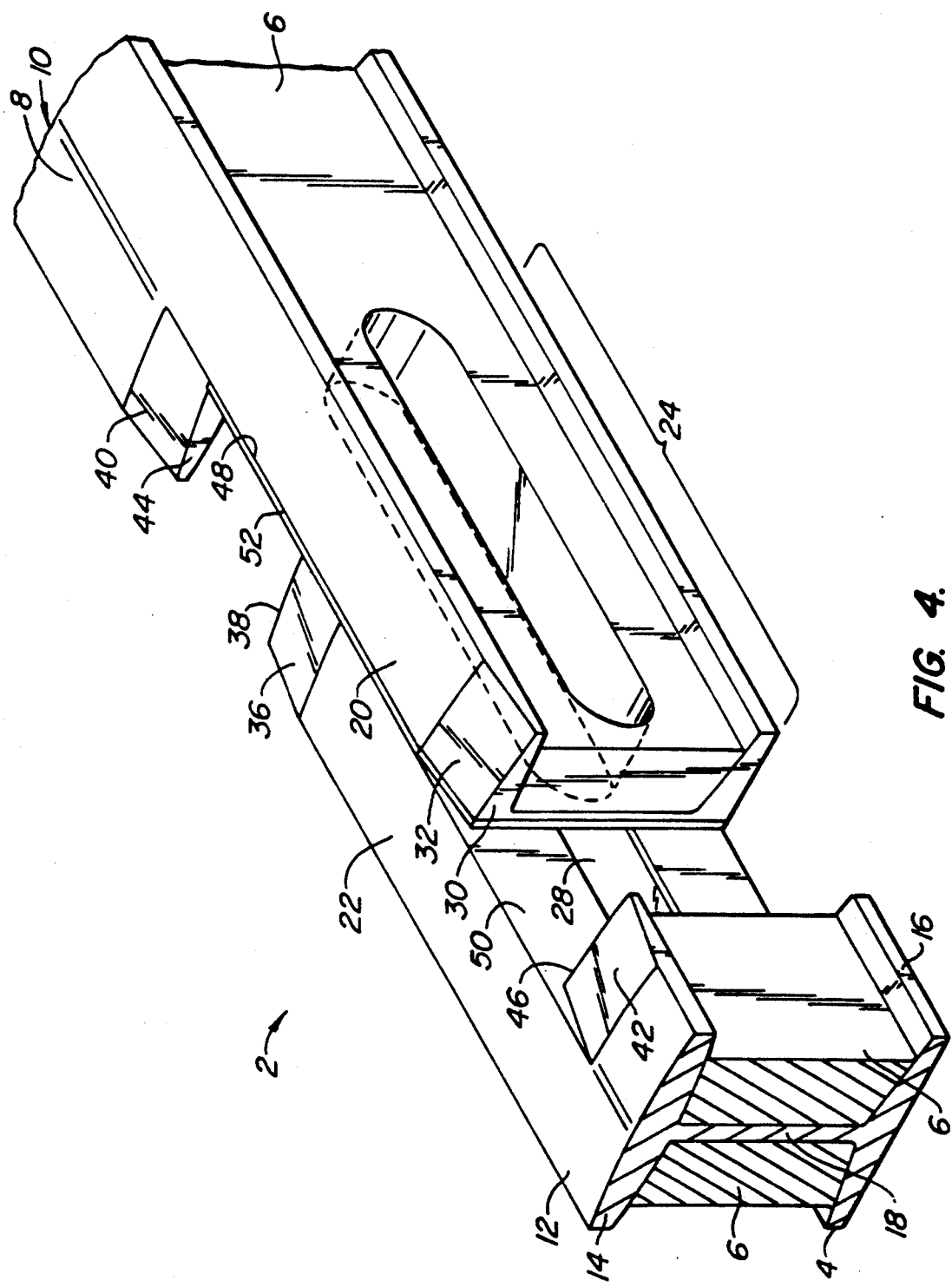
FIG. 4 is a perspective view of the adjoining half rail portions used in the invention illustrating overlapping slots for receiving guide blocks.

Expansion joint 2 facilitates a sliding interface between a first rail section 10 and a second rail section 12. As shown in FIG. 4, first rail section 10 and second rail section 12 are preferably made of identical construction having steel rail web 4 and aluminum cladding 6. Steel rail web 4 includes upper flange 14, lower flange 16 and intermediate portion 18. Intermediate portion 18 connects upper flange 14 and lower flange 16 in a generally I-beam configuration as illustrated. Aluminum cladding 6 is cast about steel rail web 4 to produce a multi-metallic rail structure. First rail section 10 and second rail section 12 are each fabricated having rail ends 20, 22 respectively. Rail ends 20, 22 are fabricated by longitudinally halving steel rail web 4 vertically as illustrated. In fabrication, a vertical cut is made to the center of intermediate portion 18 of steel rail web 14 to desired length 24. First rail end 20 and second rail end 22 are then machined to include longitudinal slots 26, 28 respectively. The extreme end 30 along the upper surface of first rail end 20 includes a chamfer 32. Preferably, chamfer 32 has an inclination angle of approximately two degrees. Likewise, second rail end 22 includes a chamfer 36 at the upper surface of extreme end 38. Corresponding chamfers 40, 42 are provided at the short ends 44, 46 of each rail section. All chamfers are preferably 2° inclines.

During assembly of expansion joint 2, first rail end 20 and second rail end 22 are aligned horizontally such that first rail end 20 and second rail end 22 compliment each other as illustrated in FIG. 4. First rail end 20 includes mating face 48. Second rail end 22 includes a corresponding mating face 50. Between mating faces 48, 50, a slide plate 52 is positioned. Slide plate 52 is preferably mechanically bonded to first rail end 20 and includes aperture 54 which corresponds to slot 26. Slide plate 52 is preferably made of brass to provide high conductivity and a smooth sliding surface for relative longitudinal movement between first rail end 20 and second rail end 22.

Referring now to FIGS. 1-3 together, expansion joint 2 is shown in the assembled condition with first rail section 10 and second rail section 12 secured together using securing means which clamp first rail end 20 and second rail end 22 together in a slidable arrangement. In the preferred embodiment, each rail end has a corresponding guide block assembly 56, 58. Each guide block assembly 56, 58 is used to put clamping tension between first rail end 20 and second rail end 22 while allowing relative longitudinal sliding movement between the two rail sections during thermal expansion and contraction.

FIG. 2 illustrates a top plan view of expansion joint 2. Preferably, guide block assemblies 56, 58 are identical in construction but reversed in orientation. For brevity, guide block assembly 56 shall be discussed in detail, the discussion applying equally to assembly 58.

Guide block assembly 56 includes guide block 60 having retainer plate 62 and threaded bolt 64. Guide block 60, retainer plate 62 and threaded bolt 64 are preferably machined of single stock material and made integral. Retainer plate 62 is secured to first clamping block 66 using four fasteners in the form of bolts 68. Retainer plate 62 is made generally rectangular and secured to first clamping block 66 at each corner by threading bolts 68 into threaded receptacles 70. This construction is intended to provide ease in installation and secure installation. Alternatively, retainer plate 62 could be welded or otherwise affixed to first clamping block 66 using other suitable means.

Guide block 60 extends from retainer plate 62 through slots 26, 28 and into second clamping block 72. First clamping block 66 and second clamping block 72 are securely held together by nut 74, washer 76, spring washer 78 and slide pad 80. Preferably, spring washer 78 is configured as a conventional Bellville washer spring set and first clamping block 66 and second clamping block 72 are made of aluminum. Slide panel 80 is preferably brass, but can be copper, aluminum or other suitable high conductivity material including alloys.

During assembly, nut 74 is torqued down and tightened against spring washer 78 by threading onto threaded bolt 64 to provide full physical contact between mating face 48, slide plate 52 and mating face 50 for full power transfer between first rail section 10 and second rail section 12. It is preferred that mating faces 48, 50 and other mating surfaces be initially and periodically thereafter lubricated with corrosion protective and conductivity enhancing non-oxide lubricants. Slide plate 52 is preferably made of solid brass to enhance rail-to-rail conductivity and provide a smooth sliding surface between the adjoining rail ends 20, 22. The tolerances of slots 26, 28 and guide block 60 of each guide block assembly 56, 58 are selected to provide smooth longitudinal movement while maintaining strict vertical alignment between first rail section 10 and second rail section 12 thereby providing a level and smooth contact surface 8 across expansion joint 2. Chamfers 32, 36, 40 and 42 facilitate transition of contact shoe 9 across expansion joint 2 without snagging or sparking across joint length 82.

The expansion length ($E_R$) 84 is the effective longitudinal distance available for expansion and contraction between rail sections 10, 12. Expansion length 84 is approximately equal to the calculated expansion rate for the particular rail system plus ½". The expansion rate is determined by installation dimensions and temperature fluctuations in the specific installation region. A typical expansion length would be 15" (14" of effective longitudinal length plus 2×½" excess to avoid potential jamming). Obviously, in very cold regions, this length could be altered to larger lengths to 20" or 24" for example. As expansion length is increased, however, structural strength must be considered.

Expansion joint 2 provides a simple and cost effective construction for power conducting rails which facilitates continuity of a resistance and enhances power conductivity. The slide plate allows free and uninhibited longitudinal movement between irrelevant rail sections without necessitating complex and expensive constructions.

The foregoing description of the preferred embodiment of the invention has been presented for purposes of illustration and description. It is not intended to be exhaustive or to limit the invention to the precise form disclosed, and obviously many modifications and variations are possible in light of the above teaching. For example, first rail section 10 and second rail section 12 could have cross-sectional shapes different from those shown in the drawings. Additionally, alternative suitable fastenings structures could be used in guide block assemblies 56, 58. The embodiments chosen and described in this description were selected to best explain the principles of the invention and its practical application to thereby enable others skilled in the art to best utilize the invention in various embodiments and with various modifications as are suited to the particular use contemplated It is intended that the scope of the invention be defined by the claims appended hereto.

What is claimed is:

1. A power conductor rial system, comprising:
   a first rail section linearly aligned with a second rail section, the first and second rail sections each having a rail web, the rail web having an upper flange, a lower flange, an intermediate portion connecting the upper flange and the lower flange, and metal cladding on the intermediate portion between the upper flange and the lower flange;
   a first half rail web extending longitudinally from the first rail section, the firs half rail web including an elongated first slot extending in a longitudinal direction of the rail section;
   a second half rail web extending from the second rail section, the second half rail web including an elongated second slot extending in a longitudinal direction of the rail section;
   a slide plate; and
   a means for securing the first and second half rail webs longitudinally slidably together wherein a portion of the first half rail web and the second half rail web overlap and sandwich the slide plate therebetween.

2. The power conductor rail system of claim 1 wherein the securing means includes a first fastener extending through the first and second slots of the first and second half rail webs.

3. The power conductor rail system of claim 2 wherein the securing means further comprises a spring washer.

4. The power conductor rail system of claim 2 wherein the securing means further comprises a second fastener extending through the first and second slots.

5. The power conductor rail system of claim 1 wherein the first and second rail sections further each comprise a chamfer on ends of the upper flanges which slope in a longitudinal direction towards the lower flange.

6. The power conductor rail system of claim 1 wherein the securing means includes a first guide block secured to the first half rail web and extending through the first slot, the first guide block drawing the first half rail web and the second half rail web slidably together using spring retention means.

7. The power conductor rail system of claim 1 wherein the slide plate is made substantially of brass.

8. An expansion joint for a power conductor rail, the power conductor rail including a first rail section and a longitudinally aligned second rail section, the expansion joining comprising:
   a first rail end extending longitudinally from one half of the cross sectional area of the first rail section, the first rail end having a length and forming a substantially flat first mating face extending parallel to a central longitudinal axis of the first rail section;
   a second rail section end extending out longitudinally from one half of the cross sectional area of the second rail section, the second rail end having a length and forming a substantially flat second mating face extending parallel to a central longitudinal axis of the second rail section;
   a slide plate positioned between the first and second mating aces; and
   clamping means securing the first and second rail section ends together in a longitudinally slidable relationship wherein the first mating face faces the second mating face.

9. The expansion joint of claim 8 wherein the first and second rail section ends are complementary such that when the first rail section and the second rail section are longitudinally slidably secured together by the clamping means, they overlap.

10. The expansion joint of claim 8 wherein the first and second rail section ends include first and second slots respectively, each slot having a first end, a second end, and a length.

11. The expansion joint of claim 10 wherein the clamping means extends through the first slot of the first rail section end and the second slot of the second rail section end.

12. An expansion joint for a power conductor rail, comprising:
   a first rail section having a first across sectional shape, an axis of symmetry, and a first rail end having a second cross sectional shape, the second cross sectional shape having the same shape as a half of the first cross sectional shape divided along the axis of symmetry;
   a second rail section having a third cross sectional shape, a second axis of symmetry, and a second rail end having a forth cross sectional shape, the fourth cross sectional shape having the same shape as a half of the third cross sectional shape divided along the second axis of symmetry; and
   securing means for slidably securing the first and second rail ends together so that the first and second rail ends can move relative to each other in a longitudinal direction of the ails wherein the second cross sectional shape and the fourth cross sectional shape are substantial mirror images of each other.

13. A method for making an expansion joint for a power conductor rail, the power conductor rail comprising a first rail section and a second rail section, the method including the following steps:
   longitudinally halving the first rail section along a first length by cutting through a center of the first rail section vertically to create a first rail end, the first rail end having a generally vertical first mating surface;
   longitudinally halving the second rail section along a second length by cutting through a center of the second rail section vertically to create a second rail end, the second rail end having a generally vertical second mating surface;
   aligning the first and second rail ends side by side so that the first and second mating surfaces face each other and a portion of the first length and the second length overlap;

providing a slide plate between the first and second mating surfaces, the slide plate having a length substantially equal to the first length;

lubricating the slide plate; and securing the first and second rail ends longitudinally slidably together so as to allow longitudinal movement of the first rail section relative to the second rail section.

14. The method of claim 13 further comprising the following steps:

forming a first slot in the first mating surface of the first rail end;

forming a second slot in the second mating surface of the second rail end; and inserting a clamping device through the first slot and the second slot.

15. A power conductor rail connection for securing adjoining rail sections end to end permitting substantial relative movements of the rail sections in a longitudinal direction due to their thermal expansions and contractions and providing an efficient, relatively low resistance electrical connection between the rail sections, the connection comprising:

opposing first and second, flat surfaces defined by the first and second rail sections at respective ends thereof, the surfaces being parallel to a longitudinal direction of the rail sections, an elongated slot in each rail section located at the respective flat surfaces and positioned so that the slots overlap when the rail sections are aligned end to end; and fastening means extending through the aligned slots of the rail sections, biasing the flat surfaces into intimate contact with each other to thereby secure the ends of the rail sections to each other and form an efficient electrical connection between the rail sections, and permitting relative slidable movement between the flat surfaces in the longitudinal direction of the rail sections to accommodate thermal expansions and contractions of the sections while maintaining the rail sections mechanically and electrically connected to each other.

16. A connection according to claim 15 including a plate disposed between the flat surfaces constructed to enhance electrical conductivity between the rail sections and to reduce friction between the flat surfaces to facilitate relative longitudinal movement between the flat surfaces.

17. A connection according to claim 15 wherein the slots in the rail section ends are defined by parallel, longitudinally extending slot surfaces, and wherein the fastening means includes a guide block extending through the slots and engaging the slot surfaces to maintain the rail section ends in mutual alignment in a direction perpendicular of the slots and parallel to the flat surfaces.

18. A connection according to claim 17 including aluminum cladding applied to and extending over the length of each rail section, including the rail section end thereof, open a surface thereof facing in the opposite direction from the flat surface, and wherein the slots extend through the aluminum cladding.

19. A connection according to claim 15 wherein the rail sections have an H-profile in cross-section including an upper flange, a lower flange and a web connecting the flanges, and wherein the flat surfaces of the rail sections are defined by a surface at each rail section end extending substantially parallel to the web from the upper flange along the web to the lower flange; whereby each rail section end defines substantially one half of an upper flange of the sections to provide a continuous slide surface on the upper flange over a length of the connection and irrespective of the extent of thermal expansion or contraction of the sections for engagement by an electric contact shoe which slides along a slide surface.

20. A rail connection according to claim 19 wherein the fastening means include means securing the guide block to one of the rail sections, a threaded nut in operative engagement with the guide block for connecting the guide block with another one of the rail sections, and means permitting relative slidable movements in a longitudinal direction of the rail sections between the threaded nut and the other one of the rail sections.

21. A rail connection according to claim 20 wherein the means permitting relative slidable movement comprises a spring washer interposed between the threaded nut and the other one of the rail sections.

22. A rail connection according to claim 20 wherein the means permitting relative slidable movements between the threaded nut and the other one of the rail connections comprises a slide plate.

* * * * *